UNITED STATES PATENT OFFICE.

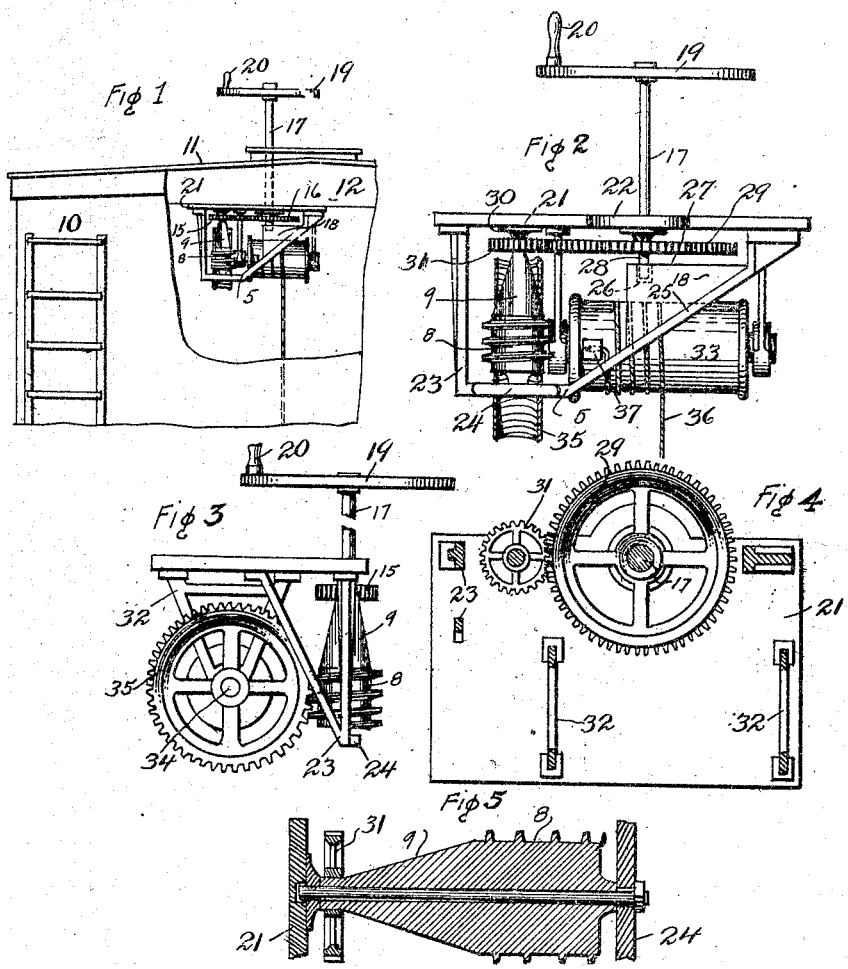

NICKLOS RUSHE, OF RANKIN, PENNSYLVANIA.

CAR-BRAKE-OPERATING MECHANISM.

1,181,684.  Specification of Letters Patent.  Patented May 2, 1916.

Application filed November 10, 1915. Serial No. 60,801.

*To all whom it may concern:*

Be it known that I, NICKLOS RUSHE, a citizen of the United States of America, residing at Rankin, in the county of Allegheny and State of Pennsylvania, have invented certain new and useful Improvements in Car-Brake-Operating Mechanism, of which the following is the specification.

This invention relates to certain new and useful improvements in car brake operating mechanism.

The primary object of the present invention is the provision of a bracket-carried operating means for the brake operating chain or cable of a railway car having a speed-multiplying connection with substantially the usual form of brake wheel and handle.

A further object of the device is the provision of a means for retaining the brake handle and wheel in a fixed position whenever shifted by the brakeman during the operation thereof, the employment of the usual ratchet wheel and pawl being obviated.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views: Figure 1 is an end view of a car partially broken away provided with the present device. Fig. 2 is an enlarged elevational view of the operating mechanism. Fig. 3 is an end elevation thereof. Fig. 4 is a horizontal longitudinal sectional view of Fig. 2, and Fig. 5 is a vertical sectional view through the operating worm.

Referring more in detail to the drawings, a car 10 is herein illustrated having a roof 11 and a brake operating shaft 17 journaled through an end beam 12 adjacent the said roof and having a wheel 19 mounted thereon provided with a handle 20. A mounting plate 21 is provided for the operating mechanism and is secured beneath the beam 12 within the car 10 and is provided with a substantially semicircular marginal off-set 22 at a point adjacent which the shaft 17 is journaled through the said plate.

A three-legged bracket 23 is dependingly carried by the plate 21 and has a horizontally journaled portion 24 and inclined leg 25. A substantially triangular block 18 is fixed to the said leg 25 having a receiving socket 26 in its upper horizontal face 27. The operating shaft 17 has its reduced lower end 28 journaled in the said socket 26, while the said shaft is provided with a large toothed gear 29 arranged horizontally beneath the plate 21 and within the bracket 23. A worm 9 is vertically journaled between the bracket portion 24 and a journaling boss 30 carried by the lower face of the plate 21, the said worm having a threaded portion 8, while the upper portion of the worm is of conical smooth formation. A small gear 31 is secured to the upper end of the worm 9 in constant mesh with the aforementioned gear 29. Oppositely positioned brackets 32 are arranged beneath the plate 21 having a drum 33 journaled therebetween and upon a shaft 34, a pinion 35 being secured to one end of the said shaft in constant operative mesh with the threaded portion 8 of the said worm.

The operating member for the brakes herein illustrated has a cord or rope 36 which is wound upon the drum 33 having one end thereof secured to the said drum as at 37.

In operation, it will be understood that the brakeman desiring to operate the brakes of the car 10 will be positioned upon the car roof 11 and by grasping the handle 12 of the brake wheel 19 may readily turn the operating shaft 17 in a desired direction, thus revolving the gears 29 and 31 for turning the worm 9 and pinion 35 effecting the desirable winding or unwinding movement of the drum 33. By means of the intervening gears 29 and 31, it will be noted that only a slight turning will be required of the operating shaft 17 to move the worm 9 sufficiently for giving the required movement to the drum 33 for setting the brakes by winding the cord 36 or releasing the same by a reverse movement of the cord. It will be also understood that by reason of the meshing gears 29 and 31, as well as the worm 9 and pinion 35 that the drum 33 will remain in any desired adjusted position until forcibly influenced by a further movement of the operating shaft 17.

While the form of the invention herein shown and described is what is believed to be the preferred embodiment thereof, it is to be understood that minor changes may be made without departing from the spirit and scope of the invention as claimed.

What I claim as new is:—

1. A device of the class described comprising a mounting plate, a three-legged bracket dependingly carried by the said plate and having one relatively long inclined leg, a triangular block mounted upon the said inclined leg and having a horizontal upper face provided with a journaling socket, the said bracket also having a horizontal bottom portion, a worm vertically arranged journaled between the said plate and horizontal-bracket portion, a brake actuating member operatively connected to the said worm, a small gear secured to the upper end of the said worm, an operating shaft journaled through the said plate and having its lower end rotatively positioned within the said socket, a relatively larger gear secured to the said shaft between said block and plate in constant mesh with the said smaller gear, and turning means for the said shaft attached to the shaft outwardly of the said plate.

2. A car brake operating mechanism comprising a plate, a three-legged bracket suspended from the said plate, an operating worm journaled between the said plate and bracket, a triangular block carried by the said bracket having a horizontal face provided with a bearing socket, a vertical shaft journaled through the said plate with its lower end arranged in the said socket, a small gear upon the said worm, a relatively large gear upon the said shaft meshing with the small gear, opposite bearings arranged rearwardly of the said bracket, a winding drum journaled in the said bearings, and a large pinion pivotally connected to the said drum and in constant mesh with the said worm.

In testimony thereof I affix my signature in the presence of two witnesses.

NICKLOS RUSHE. [L. S.]

Witnesses:
ROBERT WM. HUEY,
DORINGTON D. LYNCH.